US010577002B2

United States Patent
Gresset (10) Patent No.: US 10,577,002 B2
(45) Date of Patent: Mar. 3, 2020

(54) METHOD OF MANAGING TRANSMISSION RESOURCES IN INFRASTRUCTURE

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/337,834

(22) PCT Filed: Nov. 8, 2017

(86) PCT No.: PCT/JP2017/041004
§ 371 (c)(1),
(2) Date: Mar. 28, 2019

(87) PCT Pub. No.: WO2018/092789
PCT Pub. Date: May 24, 2018

(65) Prior Publication Data
US 2020/0039549 A1    Feb. 6, 2020

(30) Foreign Application Priority Data

Nov. 21, 2016  (EP) ................................ 16306528

(51) Int. Cl.
*B61L 27/00* (2006.01)
*B61L 25/02* (2006.01)
(Continued)

(52) U.S. Cl.
CPC ....... *B61L 27/0088* (2013.01); *B61L 15/0027* (2013.01); *B61L 25/025* (2013.01);
(Continued)

(58) Field of Classification Search
CPC .................................................. B61L 27/0088
See application file for complete search history.

(56) References Cited

U.S. PATENT DOCUMENTS

| 8,977,414 B2* | 3/2015 | Yamada | B60L 15/40 |
| | | | 701/20 |
| 9,294,928 B2* | 3/2016 | Hasegawa | H04B 1/7143 |
| 9,439,187 B2* | 9/2016 | Gresset | H04L 5/0044 |

FOREIGN PATENT DOCUMENTS

EP    2 744 141 A1    6/2014

OTHER PUBLICATIONS

International Search Report for PCT/JP2017/041004 (PCT/ISA/210) dated Mar. 2, 2018.

* cited by examiner

*Primary Examiner* — Ankur Jain (74) *Attorney, Agent, or Firm* — Birch, Stewart, Kolasch & Birch, LLP (57) ABSTRACT

The present invention relates to a method of managing transmission resources in an infrastructure (INF) comprising a plurality of wayside radio units (WRU). The method comprising: an exchange step during which a reference WRU receives cooperation data generated by one or more other WRUs, which are representative of respective failure probabilities of at least part of devices of communication onboard vehicles which are in communication with said WRU, an optimization step during which said reference WRU determines, based on the cooperation data, a resource allocation scheme defining at least time-frequency resources allocated to all or part of the devices which are in communication with said reference WRU, said resource allocation scheme being configured to maximize the probability that no transmission failure between a device and a WRU in communication therewith occurs for at least one device of each communication system across the set of devices including the devices in communication with said reference WRU and the devices for which cooperation have been received during the exchange step, an operation step, wherein said resource allocation scheme is implemented by said reference WRU.

16 Claims, 2 Drawing Sheets

(51) Int. Cl.
  *B61L 15/00*       (2006.01)
  *H04W 72/04*       (2009.01)
  *H04W 72/08*       (2009.01)
  *H04K 3/00*        (2006.01)
  *H04W 4/42*        (2018.01)

(52) U.S. Cl.
  CPC ....... *B61L 27/0005* (2013.01); *B61L 27/0038*
      (2013.01); *H04K 3/22* (2013.01); *H04W 4/42*
      (2018.02); *H04W 72/044* (2013.01); *H04W*
      *72/048* (2013.01); *H04W 72/085* (2013.01);
          *B61L 2027/005* (2013.01)

METHOD OF MANAGING TRANSMISSION RESOURCES IN INFRASTRUCTURE

TECHNICAL FIELD

The invention relates to infrastructures which allow communication systems onboard vehicles moving along a railway to communicate with other pieces of equipment, such as a ground control station. More particularly, it relates to the management of the communication resources that wayside radio units, or WRUs, of these infrastructures have and use for their communications with devices that the communication systems located onboard the vehicles comprise.

BACKGROUND ART

Nowadays, numerous trains are based on a Communication-Based Train Control, known as CBTC, in the context of which a CBTC system located onboard the train generates safety-related information about the train. These data are transferred to a ground control station using the communication system of the train which is itself connected to the control station through such an infrastructure.

In a CBTC environment, the communications of the system onboard the train include critical communications, which correspond to the communications for the exchange of the data generated by the CBTC system onboard the train and include for instance information regarding the state of the train such as its speed, its position, surveillance data, etc. In case the critical communication between the train and the control station are interrupted, an emergency stop of the train is triggered.

So as to obtain an overall configuration in which the probabilities of having the transmissions between the onboard systems and the infrastructure fail are minimal, a general approach is to optimize these probabilities for each WRU through an optimized resource allocation scheme to be implemented by the WRU, which for instance takes the form of time-frequency resources being allocated to the various devices the WRU communicates with over a predetermined time window. To that end, the WRU selects a set of orthogonal resources, such as a frequency hopping sequence among a plurality of such sequences, based on a figure of merit designed for the considered WRU and which aims at minimizing the failure probabilities of the devices in communication therewith.

SUMMARY OF INVENTION

Technical Problem

Such an approach presents drawbacks. In fact, the optimized resource allocation scheme implemented by a given WRU may have an impact over the resource allocation scheme of another WRU, such as a neighboring WRU, for instance due to intercell interferences or even due to the fact that some communication systems may have a plurality of devices which may be connected to different WRUs at a given time.

The performances of such an approach may be so that when a given WRU presents robust failure probabilities, the neighboring WRU may on the contrary present degraded probabilities.

Solution to Problem

One aim of the invention is to improve this situation.

To that end, the invention relates to a method of managing transmission resources in an infrastructure comprising a plurality of wayside radio units, or WRU, each defining a cell covering a portion of a railway on which vehicles comprising onboard communication systems move, the WRUs being arranged one after the other along the railway, each communication system comprising at least one device in communication with a WRU whose cell covers the portion in which the corresponding vehicle is located, the WRUs each having time-frequency resources adapted to be used by said WRUs for the communications with the devices of the communication systems onboard said vehicles, the method comprising, for at least one WRU, or reference WRU:

an exchange step during which said reference WRU receives cooperation data generated by each of one or more other WRUs, the cooperation data generated by a given WRU being representative of respective failure probabilities of at least part of the devices in communication with said given WRU, each failure probability being representative of a probability of a transmission failure between the considered device and the WRU in communication therewith, an optimization step during which said reference WRU determines, based on the cooperation data, a resource allocation scheme defining at least time-frequency resources allocated to all or part of the devices which are in communication with said reference WRU, said resource allocation scheme being configured to maximize the probability that no transmission failure between a device and a WRU in communication therewith occurs for at least one device of each communication system across the set of devices including the devices in communication with said reference WRU and the devices for which cooperation data have been received during the exchange step, an operation step, wherein said resource allocation scheme is implemented by said reference WRU.

According to an aspect of the invention, for at least one WRU, the cooperation data generated by said WRU include position data representative of the respective positions within the cell of said WRU of at least part of the devices located onboard vehicles located in said cell which are in communication with said given WRU, the method further comprising the determination by the reference WRU of the failure probabilities associated to the corresponding devices based on said position data received during the exchange step.

According to an aspect of the invention, the reference WRU includes a database containing performance data which are representative of a performance of communication links that may be established by devices of the communication systems at least as a function of a considered position among a plurality of possible positions, said possible positions defining a coverage of the database within the infrastructure, the failures probabilities being determined by the reference WRU based on the position data and the performance data contained in said database.

According to an aspect of the invention, the coverage of the database covers all of the respective cells of each WRU of the infrastructure.

According to an aspect of the invention, the coverage of the database covers the cell of said reference WRU and the cell of at least one WRU neighboring the reference WRU along the railway.

According to an aspect of the invention, said reference WRU is in communication with at least one device belonging to a communication system of a vehicle comprising at least one second device in communication with a second WRU different from said reference WRU, whereby said reference WRU and second WRU share at least one communication system, and the cooperation data received during the exchange step are representative at least of the failure probabilities of each device belonging to a communication system which is shared by said reference WRU and which is not in communication with said reference WRU.

According to an aspect of the invention, during the optimization step, the reference WRU carries out an assessment of whether at least one chosen device in communication with said reference and a second WRU is to be handed-over to said second WRU, or chosen second WRU, said assessment being carried out based on a comparison of a first probability that no communication failure occurs for at least one device of each communication system across the set of devices which are in communication either with the reference WRU or said chosen second WRU, and a second probability that no communication failure occurs for at least one device of each communication system across said set of devices under the hypothesis that the chosen device is in communication with said chosen second WRU instead of the first WRU.

According to an aspect of the invention, the reference WRU:
determines a first resource allocation scheme configured to maximize the probability that no communication failure occurs for at least one device of each communication system across a first set of devices including all the devices in communication with the reference WRU as well as those which belong to communication systems shared by the reference WRU and other WRUs,
determines a second resource allocation scheme configured to maximize the probability that no communication failure occurs for at least one device of each communication system across a second set of devices including all the devices in communication with said chosen second WRU and the devices belonging to communication systems which are shared by the chosen second WRU and other WRUs,
determines a third resource allocation scheme configured to maximize the probability that no communication failure occurs for at least one device of each communication system across the first set of devices under the hypothesis that the chosen device is in communication with the chosen second WRU;
determines a fourth resource allocation scheme configured to maximize the probability that no communication failure occurs for at least one device of each communication system across a set of devices including the second set of devices and the chosen device if the chosen device does not belong to the second set of devices, and
determines the first probability based on the first and third resource allocation schemes, and the second probability based on the second and fourth resource allocation schemes.

According to an aspect of the invention, the optimization step further comprises determining the resource allocation scheme to be implemented in the operation step based on said assessment.

According to an aspect of the invention, the resource allocation scheme is selected among the first and third resource allocation schemes.

According to an aspect of the invention, the resource allocation scheme is associated to a given time window, the operation step being carried out during said time window, a new resource allocation scheme being determined for every consecutive time window over a given period of time.

According to an aspect of the invention, the WRUs of the infrastructure comprise a jammer configuration database containing jammer performance data generated in response to the presence of a jammer device being detected by the infrastructure and being generated as a function of detected characteristics of the jammer device so as to account for the impact of the jammer device on the communications of the WRUs with the devices of the communication systems of the vehicles, the jammer performance data being representative of a performance of communication links that may be established by devices of the communication systems with the WRUs at least as, a function of a considered position among a plurality of possible positions, said possible positions defining a coverage of the jammer configuration database within the infrastructure, at least the optimization step being carried out on the basis of the jammer configuration database of the reference WRU in response to the jammer device being detected by the infrastructure.

According to an aspect of the invention, the cooperation data exchanged during the exchange step include, for all or part of the considered devices, an identifier of the device and an identifier of the communication link between the considered device and the corresponding WRU, said identifier of the communication link being representative at least of whether the communication link is an uplink or a downlink.

According to an aspect of the invention, the method further comprises a step of determining failure probabilities for the devices in communication with the reference WRU due to said resource allocation scheme, and a further step of exchange wherein said reference WRU generates cooperation data representative of said failure probabilities and sends them to another piece of equipment of the infrastructure, said data being destined to be received by at least one other WRU.

The invention also pertains to an infrastructure comprising a plurality of wayside radio units, or WRU, each defining a cell covering a portion of a railway on which vehicles comprising onboard communication systems move, the WRUs being arranged one after the other along the railway, each communication system comprising at least one device in communication with a WRU whose cell covers the portion in which the corresponding vehicle is located, the WRUs each having time-frequency resources adapted to be used by said WRUs for the communications with the devices of the communication systems onboard said vehicles, the infrastructure comprising at least one WRU, or reference WRU, which includes:
a communication module configured to receive cooperation data generated by each of one or more other WRUs, the cooperation data generated by a given WRU being representative of respective failure probabilities of the devices in communication with said given WRU, each failure probability being representative of a probability of a transmission failure between the considered device and the WRU in communication therewith, and
a management module configured to:
determine, based on the cooperation data, a resource allocation scheme defining at least time-frequency resources allocated to all or part of the devices which are in communication with said reference WRU, said resource allocation scheme being configured to maximize the probability that no transmission failure between a device and a WRU in communication therewith occurs for at least one device of each communication system across the set of devices including the devices in communication with said WRU and the devices for which cooperation data have been received during the exchange step,
trigger the implementation of the resource allocation scheme.

Further features and advantages of the invention will become more apparent by reading the following detailed description of the embodiments, which are given by way of non-limiting examples with reference to the appended drawings.

DESCRIPTION OF EMBODIMENTS

Figure 1:
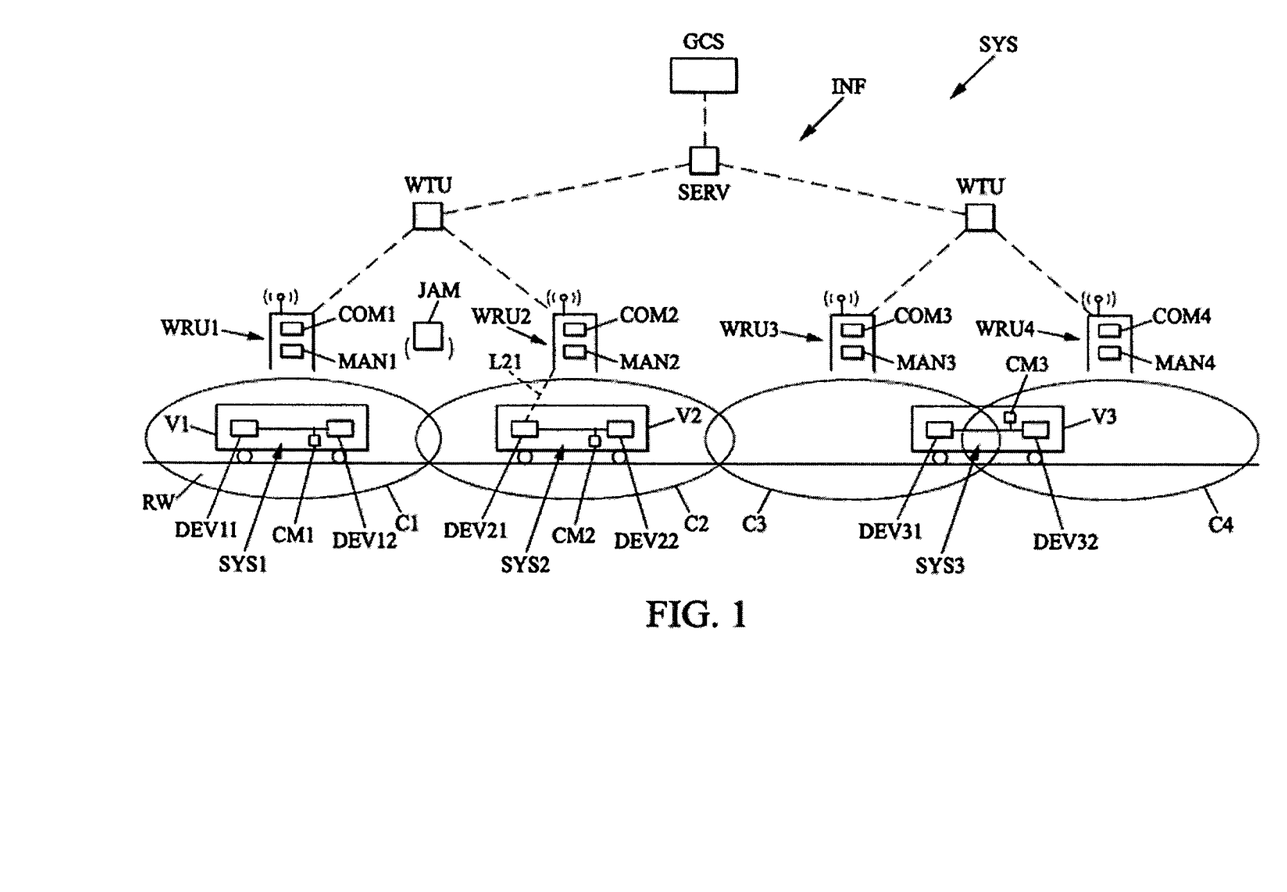
FIG. 1 is an illustration of a system and of a infrastructure according to the invention.

FIG. 1 illustrates a system SYS according to the invention.

The system SYS includes a railway RW, vehicles Vj which move along the railway, a communication infrastructure INF according the invention, and a ground control station GCS, hereinafter station GCS.

The railway RW is for instance a typical railway which includes rails which extend along a path and on which the vehicles are destined to move.

In the context of the invention, the vehicles Vj are preferably trains. In FIG. 1, three such trains V1, V2, V3 are illustrated. The rest of the description is made in a on non-limiting to a configuration in which the vehicles are thus trains.

Each train Vj comprises an onboard communication system SYSj, hereinafter system SYSj, and a CBTC module CMj.

The CBTC module CMj is adapted to be connected to the station GCS through the system SYSj. The system SYSj is itself adapted to be connected to the station GCS through the infrastructure INF. In other words, the CBTC module CMj is connected to the system SYSj, and the system SYSj connects the CBTC module CMj to the station GCS through the infrastructure.

The CBTC module CMj is configured to generate and receive operational data related to the operations of the vehicle Vj. These operational data are destined to or are transmitted from the station GCS for the operations of the train and the station GCS. These data include for instance the position of the train, the actual or target speed of the train, instruction messages such as train stop instructions, surveillance data of pieces of equipment of the train, and so on. For a CBTC-based train, an interruption of the communications between the CBTC module and the station GCS may cause an emergency stop of the train Vj and of all the trains in a same given geographical area. As such, the communication link(s) between the system SYSj and the infrastructure are critical for the operations of the trains and of the systems SYS as a whole and their interruptions being prevented is paramount.

The system SYSj comprises at least one communication device, or device, DEVji, adapted to exchange data with the infrastructure through at least one communication link Lji (only L21 is depicted in FIG. 1 for the sake of clarity). This link Lji is a downlink, i.e. data are received by the device from the infrastructure, or an uplink, i.e. the device sends data to the infrastructure INF. Each link is for instance established between the considered device and a Wayside Radio Unit, or WRU, of the infrastructure, as detailed below.

The device is a wireless communication device, and for instance comprises a bidirectional antenna module configured to establish the communication link with the infrastructure as well as a processing module configured to manage the various components of the device for their operations, in particular for the sending and receiving of data through the antenna module, and in particular the data generated or to be received by the CBTC module of the train.

The details of the structure and operations of such devices are for instance known. They can be frequency hopping modems, in particular in situations where the WRU uses a given frequency hopping sequence orthogonal to the neighboring WRUs in order to avoid inter-cell interference, i.e., two transmissions of messages from or to a WRU never collides with those sent or received from or to the WRU in a neighboring area. The orthogonality is for instance obtained by a time synchronization of the WRU and selecting time/frequency resources of the WRU (detailed below) defined by the frequency hopping sequence which do not overlap. This may be obtained by choosing a frequency hopping sequence which is shifted from one WRU to another in the time or frequency domain so as to avoid interference. The frequency-time resources used for each hop of the frequency hopping system are allocated for a transmission from a WRU to one of the trains, or for the transmission from one of the trains to a WRU. In another case, an orthogonal division multiple access system (OFDMA) over a frequency sub-band such that two neighboring WRUs do not use the same frequency sub-band and inter-cell interference is avoided.

Advantageously, in the context of the invention, at least some of the vehicles Vj have a system SYSj which includes a plurality of devices DEVji, for instance two or more such devices. As described in more details below, such devices may be in communication with different WRUs, i.e. at a given time, two devices of a given train are respectively in communication with two different WRUs.

One of the devices may be located in a front portion of the train, whereas one other device may be located in its rear portion.

The ground control station GCS is for instance a monitoring center which gathers CBTC data from the various vehicles, for instance with a view to determine modalities of their deployment across the railway (such as schedules, responses to unexpected events such as equipment failures and such). It may communicate with the infrastructure in any known manner. It may also be configured to send feedback messages to the trains for regulating the trains' operations, such as increasing or decreasing the speed of each train, stopping the trains, and so on. The GCS may also expect an acknowledgement from the train in the last case. In general, if any of the messages intended to the train or the GCS are not received correctly during a predetermined time window (for instance having a width of around 1 second), a potential safety threat is detected and a train stop is carried out. The train which has not received any message during the predetermined time window may decide by itself to stop, and the GCS may instruct the other trains to stop.

As indicated above, the infrastructure INF is adapted to allow communications between the systems SYSj and the station GCS. In effect, the infrastructure INF is a communication network, and more particularly a wireless communication network.

It includes wayside radio units, or WRUs, wayside transmission units, or WTUs, as well as a server entity SERV.

The wayside transmission units WTUs form gateways between the WRUs and the server SERV. Their detail is for instance known. The WTUs are for instance configured to allow the transmission of the train stop messages from the server SERV to all the WRUs connected to the WTU. They may also be configured to forward the data messages received by the WRUs from the trains to the server SERV.

The WTUs may be configured to allow the synchronization of the various components of the infrastructure, in particular the WRUs.

In the context of the invention, they may be configured to allow the exchange of data between the WRU, such as cooperation data detailed below. The WTUs may furthermore contain a global or partial database of information used for optimizing the resource allocation for operating the communications toward or from the devices DEVji.

The server entity SERV forms a central component of the infrastructure. For instance, its details and functionalities are known. It may for example host the CBTC application layer that decides how to operate the trains and can also host a global database of information used for optimizing the resource allocation for operating the communications toward or from the devices DEVji from all the WRUs.

The WRUs are configured to establish communication links between the devices DEVji and the infrastructure.

Figure 2:
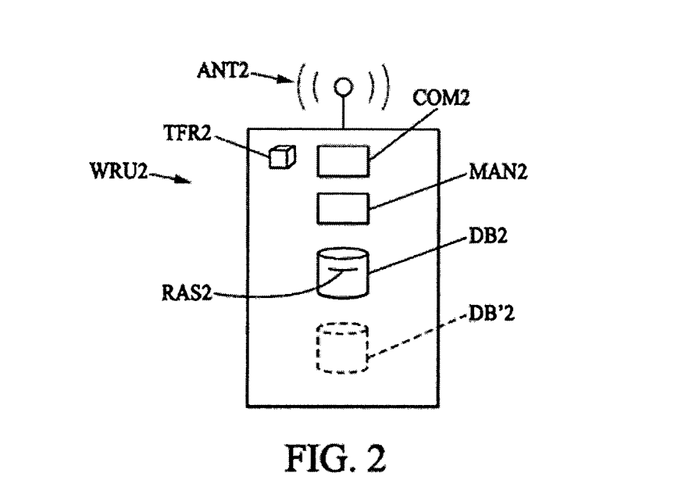
FIG. 2 illustrates a WRU of the infrastructure of FIG. 1.

In reference to FIGS. 1 and 2, for instance, they present themselves in the form of base stations. They include one or more antennas ANTi used to receive and send data to the devices DEVji in the form of electromagnetic waves which are destined to be transduced to form a signal, and are the result of the transduction of an input signal.

The WRUs each define a cell, which corresponds to a coverage area of the considered WRU within which a device located therein may establish a communication link with this WRU. The cells have reference signs C1 to C3 respectively for each WRU among WRU1, WRU2, WRU3 depicted in FIG. 1.

The WRUs are arranged along the railway so that each cell covers a portion of the railway on which the vehicles are moving. Preferably, the WRUs are arranged so that the cells of the WRUs commonly cover a continuous region of the railway. This region may correspond to a portion of the entire railway, in which case other infrastructures such as the one depicted in FIG. 1 may be used to achieve a full coverage of the railway, or may correspond to its entirety. For instance, a given WRU has at least one neighbor WRU, which is located right before or right after the given WRU along the railway.

As shown in FIG. 1, the WRUs are for instance consecutively arranged along the railway so that a given cell overlaps with the cell of the next WRU in a region which covers part of the railway. This inter-cell coverage region is thus shared by the two WRUs.

Each WRU comprises time-frequency resources (illustrated schematically on FIG. 2 with reference TFR2) the WRU is configured to use to communicate with the devices DEVji. These time-frequency resources are physical resource blocks, for instance resource blocks of an orthogonal frequency division multiplexing system (OFDM) or of an orthogonal division multiple access system (OFDMA). In effect, they correspond to spectral bands of the frequencies over which the base stations are capable to communicate for a given time slot.

In other words, each time-frequency resource corresponds' to a time slot, and for that time slot, a range of frequencies which may be allocated to the communications between the considered WRU and a device DEVji located onboard a train. A time-frequency resource may only be allocated to a given WRU for the considered time slot.

As an example, one time-frequency resource corresponds to a 15 KHz-wide frequency band over a 0.5 millisecond time slot.

One of the purposes of the invention detailed below is to approach the allocation of such resources in a manner that accounts for phenomena which, if left aside, may increase the risk of communication failures occurring between the devices and the infrastructure.

For instance, the time-frequency resources correspond to frequency sub-bands of the ISM band (for "Industrial, scientific and medical").

In what follows, the expression "resource allocation", is to be understood as corresponding to the usage planning of these resources for the transmission between a given WRU and a given device over a given time window. This time window may have a duration larger than that of a time-slot of the frequency-resources. For instance, a time window has a duration of approximately 1.5 s.

Moreover, the expression "resource allocation scheme" is to be understood as an object including the definition of the usage planning of the time-frequency resources for all the devices in communication with the considered WRU over the time window. In other words, it includes the entire usage planning of the time-frequency resources for the considered WRU and for the various devices in communication therewith for the considered time window.

It should be noted that the scheme may include other considerations. For instance, as such a scheme is a planning, it may be constructed under one or more specific hypothesis, such as one pertaining to one or more device previously in communication with the WRU being handed-over to another WRU during or prior to the time window for which the scheme is built. This aspect is detailed below.

Each WRU further includes a communication module COMi, a management module MANi, and a database DBi (where i indexes the WRUs).

The communication module COMi is configured to control the operations of the antenna(s) ANTi and forms with the latter a communication interface of the WRU with the devices and the rest of the infrastructure, such as the WTUs, the server entity SERV and the other WRUs, through which information is exchanged.

In the context of the invention, the communication module COMi is destined to receive data which have been generated by at least one other WRU. These data, or "cooperation data", are representative of respective failure probabilities of the communication links between the sending WRU and the corresponding devices, for all or part of the devices in communication with the considered WRU. In other words, these cooperation data include for one or more device information representative of the probability that the communication between this device and the WRU it communicates with fails, thereby risking to cause an emergency stop of the corresponding train.

By "representative of a failure probability", it is to be understood that the cooperation data directly correspond to the probability themselves, or correspond to data which allow this probability to be remotely determined, for instance through a position of the device and a prior knowledge of performance of communication links within the considered cell as a function of the position of the considered device within this cell. In other words, in such a scenario, the failure probability is determined by the knowledge of the position of the device (for instance as declared by the device and/or train, or estimated, for instance by the WRU) and the performance of the communication links. Other considerations may be taken into account for the determination of the failure probabilities based on position data, such as the resource allocation of the considered device, i.e. the time-frequency resources allocated to said device by the corresponding WRU. The cooperation data and the performance of communication links are detailed below with respect to the database DBi.

In addition, the module COMi is configured to send cooperation data the WRU has itself generated. These cooperation data are destined to other WRUs.

The management module MANi is configured to determine, for a given time window, a resource allocation scheme as defined above for at least part of the devices it is in communication with. According to the invention, this scheme is determined as a function of the cooperation data received from the other WRUs regarding their links with the devices they are in communication with. The management module MANi is configured to build the resource allocation scheme so as to maximize the probability that no communication failure occurs for at least one device of each communication system across the set of devices which includes, and advantageously consists of, the devices in communication with the WRU having the considered management module MANi and the devices for which cooperation have been received from other WRUs. It should be noted that the only devices for which cooperation data have been received during a predetermined lapse of time may be considered for the determination of a resource allocation scheme associated to a given time window, whereby different time windows are likely to be built based on different sets of devices.

The details of the construction of the resource allocation scheme are detailed below.

It should be noted that although the scheme is configured to maximize this probability, it may define a resource allocation for solely part of the devices the WRU is in communication with. For instance, the constraint of maximizing this probability may imply that a handover of one of these devices to another WRU needs to be carried out, whereby the resource allocation scheme will not include a resource allocation for this device for the corresponding time window as the device will then no longer be in communication with this WRU.

A given scheme is associated to a given time window, the management module being preferably configured to determine such a scheme for at least a plurality of such windows, and for instance for every consecutive time window while the WRU operates.

In addition, the management module MANi is configured to determine failure probabilities of the communication links it has with the devices DEVji. Advantageously, it is configured to do so as a function of the resource allocation scheme. In other words, it determines the failure probabilities of the respective communication links it has with the devices it is connected to after the resource allocation scheme for the corresponding time window has been determined. More particularly, the probability attached to a given device is determined based on the resource allocation for this device for the considered time window.

These probabilities are for instance solely representative of the quality of the communication links during the time window associated to the resource allocation scheme based on which they were determined. They may thus be determined for every new time window.

The database DBi is destined to store various data for the operations of the WRU, in particular the cooperation data that have been received from other WRUs and the failure probabilities it has determined for the devices it is connected with.

Advantageously, in certain embodiments, in particular with a view to determine the failure probabilities of the devices connected to other WRUs it has received cooperation data for when these cooperation data are not directly representative of these probabilities, the database DBi includes, for at least one other WRU, performance data which are representative of the performance of communication links over a given region, or "coverage" of the database. These performance data are configured to allow the determination of the failure probability of a communication link between the considered WRU and a device DEVji located in this region. As indicated above, this determination for a given device is advantageously also carried out as a function of the resource allocation for the considered time window for this device.

The details of the determination of the failure probability based on the position of a given device and the performance data are for instance known. The details of this determination when the resource allocation is taken into account are also known. In a general manner, the principle of this determination lies in cross-referencing the cooperation data with the performance data, whereby the failure probabilities are obtained in a direct manner.

Advantageously, the performance data cover at least regions of the cells of other WRUs which contain positions for which cooperation data are received.

It advantageously covers the cell of the WRU having the considered database.

Alternatively or additionally, the database may contain such data for all the WRUs of the infrastructure, or solely part of them.

Advantageously, the coverage of the database of a given WRU covers at least part of the cells of the one or more neighboring WRUs. Preferably, the coverage of the database includes at least the region within the cell of the neighbor WRU which is adjacent to its own cell (in addition to the inter-cell region). This way, the WRU may construct a representation of the situation of trains which are outside its cell but are nonetheless close. For instance, the area covered by the data is greater than half the surface of the neighboring cell (for each neighbor WRU the WRU has).

Advantageously, the coverage of the database is continuous, in that it forms a continuous region.

In some embodiments, the coverage of the database DBi corresponds to all the cells of the infrastructure. In some embodiments, it covers the cells of the neighboring WRUs, as well as the cells of the neighbors of these WRUs (i.e. the neighbor WRUs of rank 2).

In effect, the coverage of the performance data is highly adaptable.

The performance data are advantageously defined at least as a function of the considered position. In other words, two positions within the coverage will represent two performances of communication links which may be different.

The performance data may also be defined as a function of frequency sub-bands of the entire frequency range of the time-frequency resources of the considered WRU. For instance, for a given position, a plurality of performance of communication links will be reflected in the performance data, for instance one performance for each frequency sub-band of the time-frequency resources. This allows the data to reflect the fact that a given sub-band, for instance of the ISM band, will be subjected to different phenomena from those another sub-band is subjected to, thereby translating into a given position possibly corresponding to different probabilities depending of the frequency.

For instance, the performance data comprise a probability density function of a Signal to Interference plus Noise Ratio (SINR), an average SINR, and/or a probability density function of the error rate of the transmission of a message in a hop of a frequency hopping system.

From a phenomenological point of view, the performance of a given communication link between a device and a WRU depends on the realization of the random propagation channel between the transmit and receive antennas, which is a function of the position of the considered device, the diagrams of the antennas which are involved, the transmit powers and noise factor of the element which receives the communication. Additionally, this performance may also depend on the interference experienced by the receiver from other pieces of equipment in its vicinity, such as sources of interference which may be located along the railway or in the trains themselves. As such, optionally, the performance data may also reflect the random effect of such interference.

In addition, the performance data may reflect the performance of the communication links depending on whether the considered link is an uplink or a downlink.

In view of the above, the performance data reflect failures probabilities of communication links depending on the considered position within the coverage of the database, whereby having the position of a reference within this coverage allows the failure probability of its communication link with the corresponding WRU to be determined.

The set of failure probabilities of the devices across the considered set of devices allows in turn the determination of the probability that a train stops among the trains which include the considered devices.

It should be noted that the DBi may only contain the performance data. For instance, the failure probabilities themselves may be stored in a memory module, for instance in a location different from that of the database in this memory module, or in another memory module altogether.

In certain embodiments, in particular embodiments in which the WRU comprises the database DBi, advantageously, the WRU further comprises a jammer configuration database DB'i. The jammer configuration database DB'i includes jammer performance data which are representative of the failure probabilities of communication links at least as a function of the position within a given region which is covered by the database (and corresponds to its coverage). This coverage may be identical to that of the database DBi.

These jammer performances data are configured to take into account the presence of a jammer device JAM in the area of interest of the infrastructure. In effect, the jammer performance data may correspond to the performance data which are adjusted to take the jammer device into consideration.

For instance, the jammer performance data take into account the characteristics of the jammer device, such as its power, frequency band and position.

As detailed below, when a jammer device is detected, the jammer performance data of the database DB'i are built, and are used in the stead of the performance data of database DBi for the determination of the resource allocation scheme until the jammer device is detected as no longer being present. These data may be kept over time, or deleted according to a predefined criterion. In addition, the data of this database may be updated, for instance regularly, for instance so as to account for detected evolutions of its characteristics, such as movements of the latter.

In effect, the jammer performance data are advantageously identical in nature to the performance data, in particular in terms of dependency with regards to the considered position, the considered frequency sub-band, and so on, whereby the cooperation data do not need to be adapted when the database DB'i is to be used.

The method of managing resources of the infrastructure will now be described in reference to the Figures.

The method is aimed at constructing resources allocation schemes that maximize the probability that no communication failure occurs between a given number of devices and the corresponding WRUs, and advantageously across all the devices connected to a WRU of the infrastructure.

The method will be described in the perspective of a given WRU, which forms a reference WRU.

However, the process may be implemented simultaneously for different WRUs, which helps minimize the chance that at least one communication link between a device DEVji and a WRU fails.

Initially, the devices DEVji onboard the trains Vj which are located in regions of the railway RW covered by the infrastructure INF are in communication with a given WRU through a given link $L_{ji}$. The corresponding WRU applies a resource allocation scheme (either one according to the invention and detailed below, or a known scheme), through which time-frequency resources of the WRU are allocated to the various devices it communicates with.

Based on this scheme, the WRU determines the failure probability that each communication link it has with a device fails and stores this failure probability, this applying to all the WRUs. Moreover, the WRUs determine or receive (for instance from the trains themselves) data indicative of the position of the devices in their cell.

Figure 3:
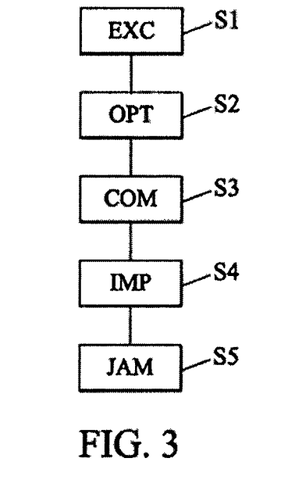
FIG. 3 illustrates a method according to the invention.

During an exchange step S1, through its communication module COMi, the reference WRU receives cooperation data from at least one other WRU, these data being representative (directly or indirectly as indicated above) of the failure probabilities of the communication links between each device among all or part of the devices in communication with the other WRU(s).

At this point, and as indicated above, these probabilities are known by the other WRUs.

Two approaches are possible regarding the extent of the cooperation data received by the reference WRU.

In the first approach, the reference WRU receives such cooperation data for all the devices in communication with a WRU of the infrastructure.

In the second approach, the reference WRU receives cooperation data for only a part of the devices.

Advantageously, the devices for which cooperation data are received include devices DEVji which are in communication with a neighboring WRU (i.e. which is the previous or following WRU along the railway) and which belong to communication systems SYSj which have at least one other device DEVji which is in communication with the reference WRU. In other words, the reference WRU receives the data representative of the failure probabilities of the devices which are not in communication with it but belong to communication systems which are shared by the reference WRU and a neighbor WRU. In some embodiments of this second approach, the cooperation data received may consist of cooperation data received for these devices.

Moreover, two philosophies are possible regarding the nature of the cooperation data representative of the failure probabilities which are received by the reference WRU.

In the first philosophy, the cooperation data are directly representative of the failure probabilities themselves. They may present themselves in an encoded form.

In the second philosophy, the cooperation data are indirectly representative of the failure probabilities. They include position data indicative at least of the position of the considered device within the cell of the WRU it is in communication with. For instance, the position data are directly representative of the position of the device. Alternatively, they are representative of the position of the train, from which the position of the device is determined.

Advantageously, the cooperation data further comprise resource allocation information representative of the resource allocation for the considered device, for instance for the time window to which the position of the device is attached. In particular, it includes information regarding the frequency sub-bands allocated to the device.

Through the performance data in the database and the cooperation data, the failure probability for the considered device may be determined.

Advantageously, all the cooperation data received refer to the same time window, whereby the resource allocation scheme is determined based on data which all represent the state of the infrastructure and the trains during a same time period. This time window may be different from that to which the resource allocation scheme determined in a further step is attached to. However, the failure probabilities reflected in the cooperation data are advantageously attached to the same time window as that for which the resource allocation scheme built by the reference WRU is determined.

It should be noted that the extent of the coverage of the data in the database DBi depends on the approach which is applied, whereby the stored data advantageously cover all the cells of all the WRUS in the context of the first approach, and at least the cells of the neighboring WRUs in the second approach.

Advantageously, the position data may include further data, such as speed data, acceleration data (these data may be seen as additional data relative to the position data, as they do not correspond to position data per se).

The two philosophies may be hybridized in that the cooperation data may include the probabilities for some cells and/or some regions of certain cells, and may include the position data for positions outside these cells/regions. The prescribed form may be determined based on the covered area of one or more of the databases DBi.

Regardless of the philosophy, the cooperation data advantageously comprise an identifier of the device the data are attached to, as well as a communication link identifier indicative at least of whether the corresponding link is an uplink or a downlink. Moreover, they may include an identifier of the WRU which is involved in the corresponding communication with the considered device.

Once received, if not provided directly through the cooperation data, the failure probabilities are determined based on the performance data of the database DBi using the received position data (and the other data the cooperation data might include).

In an optimization step S2, the management module of the reference WRU determines a resource allocation scheme (schematically shown on FIG. 2 as being stored in the database DBi with reference RAS2). This scheme defines at least time-frequency resources allocated to all or part of the devices which are in communication with said WRU. As indicated above, the scheme is defined for a given time window, and is destined to be implemented in this time window.

The resource allocation scheme is configured to maximize the probability that no train stop occurs, or in other word that there is at least one communication link between a device of each communication system SYSj and the WRU in communication therewith that do not experience a transmission failure. Thus, the WRU performs the computation of the resource allocation scheme at least across the set of devices including the devices in communication with said WRU and the devices for which performance data representative of the failure probability of the communications of said devices with the associated WRUs have been received during the exchange step.

The optimization problem of minimizing the probability of train stop across the considered set of communication systems and devices can be set as follows:

Let k in 1 . . . K be an index of the WRUs involved in communications with the devices of the set, Let j in 1 . . . J be an index of the communication systems to which the considered devices belong, Let i(j) in 1 . . . I(j) be an index of the devices in the j-th communication system, the devices belonging to the considered set of devices.

It should be noted that these indices may not correspond to those used in the reference signs.

We further define w(j,i(j)) as the index of the WRU to which the i(j)-th device of the j-th communication system is attached.

Let p(j,i(j),k) be the probability of transmission failure from the k-th WRU to the i(j)-th device of the j-th communication system.

This probability for each device in communication with the reference WRU is known, and for the other devices of the set, has been determined during step S1 after reception of the cooperation data.

The probability that no train stop occurs for at least one device of each communication system across the set of devices, which is sought to be maximized, is the probability that, for all the communication devices, at least one of the transmission between the devices of said communication systems, and the corresponding WRUs does not fail, which is:

$$P_{NTS} = \prod_{j=1}^{J} \left(1 - \prod_{i(j)=1}^{I(j)} p(j, i(j), w(j, i(j)))\right)$$

where:
  p(j,i(j), w(j,i(j))) is the probability of failure of the transmission between the w(j,i(j))-th WRU and the i(j)-th device of the j-th communication system belongs to;
  $\Pi_{i(j)=1}^{I(j)} p(j,i(j), w(j,i(j)))$ is the probability that all transmissions between the j-th communication system and the corresponding WRU are in failure;
  $1-\Pi_{i(j)=1}^{I(j)} p(j,i(j),w(j,i(j)))$ is the probability that at least one transmission between the j-th communication system and the corresponding WRU(s) is not in failure, which involves that said j-th communication system could receive its message;

$$\prod_{j=1}^{J} \left(1 - \prod_{i(j)=1}^{I(j)} p(j, i(j), w(j, i(j)))\right)$$

is the probability that all the trains could correctly receive their message, which involve that no train stop occurs.

One of the difficulties of optimizing this problem is that everything can be inter-dependent. A local change of a resource allocation at a given WRU may impact the quality of the communication links of the next WRU which manages other devices, and so on.

The invention accounts for this phenomenon by taking into consideration for the determination of the resource allocation scheme of a given WRU the probabilities of a communication failure associated to devices which are not connected to the latter.

In the context of the first approach, this phenomenon is accounted for at the level of the entire infrastructure.

In the context of the second approach, this problem is seen under the perspective that if a train j' has no device attached to the k-th WRU, then the product $$\left(1 - \prod_{i(j')=1}^{I(j')} p(j', i(j'), w(j', i(j')))\right)$$

has no impact on the result of the optimization of $P_{NTS}$ at the considered WRU (it has an impact on the $P_{NTS}$ value itself, but not on the decisions of the optimal resource allocation that gives p(j,i (j),k) as a result).

Regarding the first approach, let $P_{NTS}^{(k)}$ be the probability of no train stop from the perspective of the reference WRU of index k. The reference WRU determines the probabilities p(j',i'(j'),w(j',i'(j'))) for all couples (j',i'(j')) such that w(j', i'(j')) is different from k, which are assumed to be fixed variables from the perspective of k. The determination of these probabilities is carried out based on the cooperation data received during step S1, either through cross-reference of the data of the database DBi with the cooperation data, and/or through the received data themselves which are directly indicative of these probabilities.

$P_{NTS}^{(k)}$ then becomes a function of the probabilities p(j,i (j),k) for all couples (j,i(j)) such that w(j,i(j))=k, which can be minimized via the resource allocation scheme.

From there on, the reference WRU constructs an optimal resource allocation scheme, in particular the allocation planning of the time frequency resources, for the devices serviced by the reference WRU.

The details of the process of the construction of this allocation scheme, in particular the allocation of the time-frequency resources, may be known. For instance, it relies on the figure of merit $P_{NTS}^{(k)}$ described above, i.e. a metric, which is predetermined and whose value varies depending on the potential allocation scheme evaluated among a set of potential allocation schemes, the allocation scheme which is retained corresponding to the one optimizing the value of the metric.

Let N be a number of resources available in the considered time window. For each time-frequency resource n and each link between the device DEVij and the WRU k, the link performance is denoted lp(j,i(j),k,n) (i.e. the performance data representative of the performance of the corresponding communication link).

In a first case, when a frequency hopping system is used, the link performance lp(j,i(j),k,n) may be the probability of error for a message transmission on the resource, and the probability of failure of the link p(j,i(j),k) is defined as the probability that no message was successfully received by the receiver on the link. Thus, if the set of resources indexes is S(j,i(j),k) allocated to said link, the probability of failure is defined by $$p(j, i(j), k) = \prod_{n \in S(j,i(j),k)} lp(j, i(j), k, n)$$

In a second case, when an OFDMA system is used, the link performance lp(j,i(j),k,n) is for example the SINR, and the probability of failure of the link p(j,i(j),k) is defined as the probability of error for sending the message which is for example given by $$p(j, i(j), k) = Q\left(\sqrt{\sum_{n \in S(j,i(j),k)} lp(j, i(j), k, n)}\right)$$

where Q( ) is the Q-function which is the tail probability of the standard normal distribution.

In other words, since lp(j,i(j),k,n) is known for the considered device DEVij, WRU k, and all resources n, it is possible to compute p(j,i(j),k) and optimize the resource allocation indexes S(j,i(j),k) for all considered devices.

In a first example, let us consider that several resource allocation schemes are predetermined that allows to share the resource in the considered time window between the transmissions to/from the different devices DEVij. Then, several values of $P_{NTS}$ are computed by taking into account each possible choice of resource allocation scheme at the k-th WRU, and by using the probabilities obtained from the others WRUs. The resource allocation scheme minimizing $P_{NTS}$ is then selected. When possible, an optimal resource allocation algorithm tests exhaustively all the possible sharing of resource among the devices such that w(j,i(j))=k.

In another example, an algorithm is used to allocate each resource to a transmission link as follows: First, all the sets S(j,i(j),k) such that w(j,i(j))=k are initialized to an empty set. A loop is done on all the resources n. For all devices such that w(j,i(j))=k, the probability $P_{NTS}$ is computed as if the n-th resource is added to the set S(j,i(j),k), and finally selected and added to the corresponding set of indexes of the devices for which the best probability $P_{NTS}$ computation has been obtained. At the end of this algorithm, all the resources are allocated and shared between the devices such that w(j,i(j))=k. Many variations of this algorithm can improve the performance and reach an even better probability $P_{NTS}$, such as repeating the main steps of the algorithm iteratively.

Regarding the second approach, let $P_{local}^{(k)}$ be the local probability to be maximized at the reference WRU (of index k), based on the set $\Omega_k$ of vehicles indexes such that at least one of their devices is attached to the k-th WRU (i.e., for all $j \in \delta_k$, there exists at least one i(j) such that w(j,i(j))=k).

$$P_{local}^{(k)} = \prod_{j \in \Omega_k} \left(1 - \prod_{i(j)=1}^{I(j)} p(j, i(j), w(j, i(j)))\right)$$

The determination of the resource allocation scheme is then conducted so as to maximize this probability, for instance in a process that is similar to a process that may be used in the context of the first approach.

Once the resource allocation scheme has been determined, the respective failure probabilities of the communication links between the reference WRU and the devices which were allocated time-frequency resources in the resource allocation scheme are determined. The probabilities p(j,i(j),k) are obtained from the resource allocation for example defined by the resource allocation indexes S(j,i(j), k) as described previously.

For instance, they are determined based on the performance data of the database DBi, in particular those corresponding to positions within the cell of the reference WRU.

Indeed, the database allows to obtain the values lp(j,i(j),k,n) of the expression of p(j,i(j),k).

In a step S3, the probabilities of failure determined for the devices of the reference WRU are communicated to at least one other WRU in the form of cooperation data, either directly or through another piece of equipment of the infrastructure. Whether in this step or in any other, communication between WRUs may be carried out through a WTU and/or the server entity, or may be carried out directly between the WRUs. The cooperation data send are of the same nature as those described above.

This allows the spreading of the newly determined failure probabilities to other WRUS, for instance with a view of having the various WRUs of the infrastructure determine a resource allocation scheme according to the process above.

In a step S4, the resource allocation scheme determined in step S2 is implemented. In effect, it is implemented during the corresponding time window. It translates into the time-frequencies of the reference WRU which have been allocated to the communication links between the reference WRU being employed for the needs of these communication links during the time window. For instance, a given time-frequency resource is employed to transmit at least one message, for instance a single message.

In some embodiments of the method above, in particular step S2, the resource allocation scheme corresponds to time-frequency resources being allocated to each device in communication with the reference WRU for the corresponding time window.

In other embodiments, the resource allocation scheme may correspond to time-frequency resources being allocated to only part of the devices which are in communication with the reference WRU. In these cases, it may include an assessment of whether one of the devices needs to be handed over to another WRU, in particular a neighbor WRU, whereby the devices in communication with the reference WRU during the future time window may differ from the devices in communication with the reference WRU at the time the resource allocation scheme is determined.

In such embodiments, let $P_{pair}^{(k,k')}$ air be a pair-wise probability to be maximized at the k-th (the reference) and k'-th WRUs, based on the set $\Psi_{k,k'}$ of train indexes such that at least one of their devices is either attached to the k-th or k'-th WRU (i.e., for all $j \in \Psi_{k,k'}$, there exists at least one i(j) such that w(j,i(j))=k or w(j,i(j))=k'). The k'-th WRUs can be seen as second WRUs, these second WRUs being for instance neighbor WRUs with respect to the reference WRU. $P_{pair}^{(k,k')}$ is as follows:

$$P_{pair}^{(k,k')} = \prod_{j \in \Psi_{k,k'}} \left(1 - \prod_{i(j)=1}^{I(j)} p(j, i(j), w(j, i(j)))\right)$$

The assessment of whether a handover should be carried out, in particular a handover of a device serviced by the reference WRU to a chosen second WRU k', is conducted based on $P_{pair}^{(k,k')}$ and on $\hat{P}_{pair}^{(k,k')}$, which corresponds to $P_{pair}$ under the hypothesis that a device of interest has been handed-over to the WRU k', i.e., by forcing w(j,i(j))=k' for a device such that w(j,i(j))=k.

In these embodiments, during step S2, for one or more chosen device connected to the reference WRU, the reference WRU determines a first resource allocation scheme as described above for the considered time window, the first resource allocation scheme being conducted so as to maximize the probability that no failure occurs for at least one device of each communication system across the considered set of devices and so as to allocate time frequency resources to all the devices it is connected to. Advantageously, the considered set of devices corresponds to all the devices in communication with the reference WRU as well as those which belong to communication systems shared by the reference WRU and other WRUs.

In addition, it determines a second resource allocation scheme as defined above for the considered time window so as to maximize the probability that no failure occurs for at least one device of each communication system across a set of devices including all the devices in communication with the chosen second WRU and the devices belonging to communication system which are shared by this chosen second WRU and other WRUs.

In other words, the reference WRU determines the second resource allocation scheme of the chosen second WRU by placing itself in its stead.

To that end, during step S1, the reference WRU receives cooperation data representative of the respective probabilities of failure for the devices of this set. In addition, advantageously, the database DBi of the reference WRU covers a region covering the cells of its neighbor WRUs as well as those of the neighbor WRUs of its neighbors, in particular if the received cooperation data include position data.

Moreover, the reference WRU determines a third resource allocation scheme so as to maximize the probability that no failure occurs for at least one device of each communication system across the set of devices used for the first resource allocation scheme under the hypothesis that the chosen device is connected to the chosen second WRU. This third resource allocation scheme is for instance configured to allocate time-frequency resources to all the devices connected to the reference WRU except the chosen device, to which no resource is allocated given it is considered to be connected to another WRU.

In addition, the reference WRU determines a fourth resource allocation scheme so as to maximize the probability that no failure occurs for at least one device of each communication system across the set of devices which includes the set of devices used for the second resource allocation scheme as well as the chosen device if it does not belong to the latter.

In other words, it determines the resource allocation of the chosen second WRU under the hypothesis that the chosen device is connected to this second WRU.

From these four resource allocation schemes, the reference WRU determines $P_{pair}^{(k,k')}$ and $\hat{P}_{pair}^{(k,k')}$.

More particularly, $P_{pair}^{(k,k')}$ is determined based on the first and second resource allocation schemes. $\hat{P}_{pair}^{(k,k')}$ is determined based on the third and fourth pair allocation schemes. Once they have been determined, the reference WRU compares these two elements and determines whether a hand-over of the chosen device to the second WRU is needed as a function of at least this comparison.

It should be noted that the modalities of this decision may be designed to prevent ping-pong effects, whereby a given device is frequently handed-over from one WRU to another. In effect, the decision may factor in other components, such as other conditions which may be used to determine whether a handover should be carried, whereby such a decision is made at least as a function of the above assessment.

If a handover is determined as being needed, it is performed, for instance in any known manner. If it is determined as not being needed, the chosen device remains serviced by the reference WRU.

Depending on the result of the assessment, the resource allocation scheme which is retained for step S4 is for instance chosen among the first and third allocation schemes above.

Alternatively, the resource allocation scheme is determined anew to factor in the handover of the chosen device. To that end, the determination principle described above in reference to the previous embodiment may be employed.

Moreover, in some embodiments, the second and/or fourth resource allocation scheme is sent to the chosen second WRU. This second WRU may, then implement the corresponding allocation scheme in the corresponding time window depending on whether the handover is determined as needed.

The process above regarding the handover assessment has been given for one chosen device at a time. However, it may be carried out on the basis of a plurality of devices being chosen at a time. Moreover, this process may be repeated over time, for instance every predetermined number of time window(s), or upon detection of specific events.

From there on, the previous steps are repeated over time, for instance for each new time window which is considered, whereby a resource allocation scheme is determined for this time window and implemented at the corresponding instants. Its implementation is for instance triggered by the management module.

During a step S5, which for instance is triggered in response to a jammer device JAM being detected by the infrastructure with characteristics which are disruptive for the operations of the infrastructure, the reference WRU, and advantageously all the WRUs, receive data representative of the presence of jammer device and of its characteristics. In response, the database DB'i is generated by the reference WRU (and by the other WRUs if need be) based on the database DBi and the characteristics of the jammer device JAM.

From there on, and until the jammer device is no longer detected, the resource allocation schemes which are determined on the basis of the previous steps for the time windows to come are determined based on the database DB'i instead of the database DBi. In other words, the position data received are used to determine the failure probabilities for the devices connected to other WRUs on the basis of database DB'i rather than DBi.

The database DB'i is for instance updated, such as regularly, to account for the changes of the characteristics of the jammer device JAM.

The steps above are advantageously carried out not only at the reference WRU, but also at the other WRUs of the infrastructure.

The invention presents several advantages. In fact, by factoring in the interdependences of the qualities of the communication links of devices which are outside the cell of the considered WRU, the resulting robustness of the infrastructure is increased, all the more so as the process is carried out by different WRUs.

Moreover, it is adaptive in that it may be chosen to account for this phenomenon to a full extent by factoring in the situation of all the devices of the infrastructure, which is particularly adapted to infrastructure which allow rather extensive communications between the WRUs, or to focus on this phenomenon at the level of the devices which belong to communication systems shared by different WRUs, whereby the need to exchange an important volume of information between the WRUs is toned down without a substantial decrease of the robustness of the system. Moreover, the form by which the data are conveyed may be also adapted to the circumstances, and in particular to the communication abilities of the WRUs.

In addition, it is flexible in its very structure, as it may be chosen to assess whether handovers are needed in view of the data at hand, thereby adding another refinement layer to the overall management of the infrastructure.

Moreover, the overall approach of the process is a distributed one as it does not need data to be converged to a central processing piece of equipment, which may be very impractical in some infrastructure configurations.

In the description above, the cooperation data have been described as being exchanged between the WRUs. However, they may be received by the WRUs from another piece of equipment, such as the server entity. In this case, this entity may be configured to collect all the data from the devices of the infrastructure, and to send the data pertaining to a given number of devices/trains to the WRUs, for instance upon request.

Moreover, in some embodiments, a list of trains whose communication system is shared between WRUs may be stored by one or each of the involved WRUs. This list is updated regularly and/or upon specific events, such as handovers of the devices which belong to shared communication systems to a different WRU than their current WRU. For instance, this list determines the device for which the data are received in step S1, the devices being thus likely to change over time and the resource allocation schemes for future time windows possibly being determined on the basis of varying sets of devices.

The list of a given WRU may include the devices which are in communication with the considered device, as well as devices which are in communication with other WRUs but belong to communication systems shared by the considered device and other WRUs. Upon reception of such a list, a given WRU may then construct a precise picture of the communication situation of the WRU which has established the list.

Moreover, the position data received at a given time may be used to estimate the failure probabilities of the corresponding device for a plurality of time windows, in particular when the position data include speed and acceleration data. The reference WRU then estimates over the future time windows the position of the train, and determines the corresponding failure probabilities based on these estimated positions.

It should be noted that during the method, the data used for the generation of a resource allocation scheme may be attached to a time window which differs from that for which the scheme is determined. For instance, so as to initiate the method, a first resource allocation scheme may be determined by the reference WRU in the absence of cooperation data, for instance under an assumption regarding the failure probabilities associated to devices for which it is expected to receive cooperation data at a later time. For instance, these probabilities are arbitrarily chosen equal to zero.

Moreover, regarding the time window to which the cooperation data are attached, for instance at any point during the process, for one or more time windows for which a resource allocation scheme is to be determined, it may be chosen to consider cooperation data which relate another time window, as indicated above.

In particular, for each new considered time window, it may be decided to take into account the most recently received cooperation data regardless of the time window to which they are attached. Thus, (and in general), they may not be attached to a same time window, although advantageously they are attached to time windows which are close in time (for instance distant from one another by less than 10 or 5 times the duration of a time window), if not to a same time window.

The invention claimed is:

1. A method of managing transmission resources in an infrastructure comprising:
a plurality of wayside radio units (WRUs), each defining a cell covering a portion of a railway on which vehicles comprising onboard communication systems move, the WRUs being arranged one after the other along the railway, each communication system comprising at least one device in communication with a WRU whose cell covers the portion in which the corresponding vehicle is located, the WRUs each having time-frequency resources adapted to be used by said WRUs for the communications with the devices of the communication systems onboard said vehicles, the method comprising, for at least one WRU:
exchanging, during which said reference WRU receives cooperation data generated by each of one or more other WRUs, the cooperation data generated by a given WRU being representative of respective failure probabilities of at least part of the devices in communication with said given WRU, each failure probability being representative of a probability of an interruption of the communication link between the considered device and the WRU in communication therewith, said interruption risking causing an emergency stop of the corresponding vehicle,
optimizing, during which said reference WRU determines, based on said failure probabilities, a resource allocation scheme defining at least time-frequency resources allocated to all or part of the devices which are in communication with said reference WRU, said resource allocation scheme being configured to maximize the probability that no transmission failure between a device and a WRU in communication therewith occurs for at least one device of each communication system across the set of devices including the devices in communication with said reference WRU and the devices for which cooperation data have been received during the exchange step, and
operating, wherein said resource allocation scheme is implemented by said reference WRU.

2. The method according to claim 1, wherein for at least one WRU, the cooperation data generated by said WRU include position data representative of the respective positions within the cell of said WRU of at least part of the devices located onboard vehicles located in said cell which are in communication with said given WRU, the method further comprising determining by the reference WRU of the failure probabilities associated to the corresponding devices based on said position data received during said exchanging.

3. The method according to claim 2, wherein the reference WRU includes a database containing performance data representative of performance of communication links that may be established by devices of the communication systems at least as a function of a considered position among a plurality of possible positions, said possible positions defining a coverage of the database within the infrastructure, the failures probabilities being determined by the reference WRU based on the position data and the performance data contained in said database.

4. The method according to claim 3, wherein the coverage of the database covers all of the respective cells of each WRU of the infrastructure.

5. The method according to claim 3, wherein the coverage of the database covers the cell of said reference WRU and the cell of at least one WRU neighboring the reference WRU along the railway.

6. The method according to claim 1, wherein said reference WRU is in communication with at least one device belonging to a communication system of a vehicle comprising at least one second device in communication with a second WRU different from said reference WRU, whereby said reference WRU and second WRU share at least one communication system, and wherein the cooperation data received during the exchanging are representative at least of the failure probabilities of each device belonging to a communication system which is shared by said reference WRU and which is not in communication with said reference WRU.

7. The method according to claim 6, wherein during the optimizing, the reference WRU carries out an assessment of whether at least one chosen device in communication with said reference and a second WRU is to be handed-over to said second WRU, or chosen second WRU, said assessment being carried out based on a comparison of a first probability that no communication failure occurs for at least one device of each communication system across the set of devices which are in communication either with the reference WRU or said chosen second WRU, and a second probability that no communication failure occurs for at least one device of each communication system across said set of devices under the hypothesis that the chosen device is in communication with said chosen second WRU instead of the first WRU.

8. The method according to claim 7, wherein the reference WRU:
determines a first resource allocation scheme configured to maximize the probability that no communication failure occurs for at least one device of each communication system across a first set of devices including all the devices in communication with the reference WRU as well as those which belong to communication systems shared by the reference WRU and other WRUs,
determines a second resource allocation scheme configured to maximize the probability that no communication failure occurs for at least one device of each communication system across a second set of devices including all the devices in communication with said chosen second WRU and the devices belonging to communication systems which are shared by the chosen second WRU and other WRUs,
determines a third resource allocation scheme configured to maximize the probability that no communication failure occurs for at least one device of each communication system across the first set of devices under the hypothesis that the chosen device is in communication with the chosen second WRU;
determines a fourth resource allocation scheme configured to maximize the probability that no communication failure occurs for at least one device of each communication system across a set of devices including the second set of devices and the chosen device if the chosen device does not belong to the second set of devices, and determines the first probability based on the first and third resource allocation schemes, and the second probability based on the second and fourth resource allocation schemes.

9. The method according to claim 8, wherein the optimizing further comprises determining the resource allocation scheme to be implemented in the operation step based on said assessment.

10. The method according to claim 8, wherein the resource allocation scheme is selected among the first and third resource allocation schemes.

11. The method according to claim 7, wherein the optimizing further comprises determining the resource allocation scheme to be implemented in the operation step based on said assessment.

12. The method according to claim 1, wherein the resource allocation scheme is associated to a given time window, the operation step being carried out during said time window, a new resource allocation scheme being determined for every consecutive time window over a given period of time.

13. The method according to claim 1, wherein the WRUs of the infrastructure comprise a jammer configuration database containing jammer performance data generated in response to the presence of a jammer device being detected by the infrastructure and being generated as a function of detected characteristics of the jammer device so as to account for the impact of the jammer device on the communications of the WRUs with the devices of the communication systems of the vehicles, the jammer performance data being representative of a performance of communication links that may be established by devices of the communication systems with the WRUs at least as a function of a considered position among a plurality of possible positions, said possible positions defining a coverage of the jammer configuration database within the infrastructure, at least the optimization step being carried out on the basis of the jammer configuration database of the reference WRU in response to the jammer device being detected by the infrastructure.

14. The method according to claim 1, wherein the cooperation data exchanged during the exchanging include, for all or part of the considered devices, an identifier of the device and an identifier of the communication link between the considered device and the corresponding WRU, said identifier of the communication link being representative at least of whether the communication link is an uplink or a downlink.

15. The method according to claim 1, further comprising determining failure probabilities for the devices in communication with the reference WRU due to said resource allocation scheme, and exchanging, wherein said reference WRU generates cooperation data representative of said failure probabilities and sends them to another piece of equipment of the infrastructure, said data being destined to be received by at least one other WRU.

16. An infrastructure comprising a plurality of wayside radio units, or WRU, each defining a cell covering a portion of a railway on which vehicles comprising onboard communication systems move, the WRUs being arranged one after the other along the railway, each communication system comprising at least one device in communication with a WRU whose cell covers the portion in which the corresponding vehicle is located, the WRUs each having time-frequency resources adapted to be used by said WRUs for the communications with the devices of the communication systems onboard said vehicles, the infrastructure comprising at least one WRU, or reference WRU, which includes:

a communication module configured to receive cooperation data generated by each of one or more other WRUs, the cooperation data generated by a given WRU being representative of respective failure probabilities of the devices in communication with said given WRU, each failure probability being representative of a probability of an interruption of the communication link between the considered device and the WRU in communication therewith, said interruption risking causing an emergency stop of the corresponding vehicle, and a management module configured to:
    determine, based on said failure probabilities, a resource allocation scheme defining at least time-frequency resources allocated to all or part of the devices which are in communication with said reference WRU, said resource allocation scheme being configured to maximize the probability that no transmission failure between a device and a WRU in communication therewith occurs for at least one device of each communication system across the set of devices including the devices in communication with said WRU and the devices for which cooperation data have been received during the exchange step, and
    trigger the implementation of the resource allocation scheme.

* * * * *